(12) United States Patent
Beenen

(10) Patent No.: US 10,933,796 B2
(45) Date of Patent: Mar. 2, 2021

(54) TRUCK BED ACCESSORY MOUNTING PANELS

(71) Applicant: BuiltRight Industries LLC, Minneapolis, MN (US)

(72) Inventor: Matt Beenen, Minneapolis, MN (US)

(73) Assignee: BuiltRight Industries LLC, Brookfield, CT (US)

( * ) Notice: Subject to any disclaimer, the term of this patent is extended or adjusted under 35 U.S.C. 154(b) by 0 days.

(21) Appl. No.: 16/140,223

(22) Filed: Sep. 24, 2018

(65) Prior Publication Data

US 2019/0092213 A1    Mar. 28, 2019

Related U.S. Application Data

(60) Provisional application No. 62/561,774, filed on Sep. 22, 2017.

(51) Int. Cl.

| | |
|---|---|
| *B60P 7/08* | (2006.01) |
| *B62D 33/023* | (2006.01) |
| *B60R 9/02* | (2006.01) |
| *B60R 9/06* | (2006.01) |
| *B62D 33/02* | (2006.01) |
| *B60R 5/00* | (2006.01) |
| *B60R 7/00* | (2006.01) |
| *B60R 5/04* | (2006.01) |
| *B60P 3/00* | (2006.01) |
| *B60R 7/02* | (2006.01) |

(Continued)

(52) U.S. Cl.
CPC ............. *B60P 7/0807* (2013.01); *B60P 3/007* (2013.01); *B60R 5/00* (2013.01); *B60R 5/006* (2013.01); *B60R 5/04* (2013.01); *B60R 7/00* (2013.01); *B60R 7/005* (2013.01); *B60R 7/02* (2013.01); *B60R 9/00* (2013.01); *B60R 9/02* (2013.01); *B60R 9/06* (2013.01); *B60R 9/065* (2013.01); *B62D 33/023* (2013.01); *B62D 33/0207* (2013.01); *B65D 90/0053* (2013.01)

(58) Field of Classification Search
CPC .... B60P 7/0807; B60P 3/007; B65D 90/0066; B65D 85/54; B65D 90/0053; B60R 9/065; B60R 9/00; B60R 7/005; B60R 9/045; B60R 9/055; B60R 9/048; B60R 7/02; B60R 5/04; B60R 5/006; B60R 7/00; B60R 5/00; B60R 9/06; B60R 9/02; B62D 33/04; B62D 33/0207; B62D 33/023; B62D 25/02
USPC ....... 410/10, 11, 96, 97, 100, 102, 106, 108, 410/109, 110, 115, 116, 118
See application file for complete search history.

(56) References Cited

U.S. PATENT DOCUMENTS

| | | | |
|---|---|---|---|
| 6,851,735 B2 * | 2/2005 | Hicks ........................ | B60R 7/02 410/130 |
| 2002/0012576 A1 * | 1/2002 | Anderson ............. | B60P 7/0815 410/106 |
| 2009/0014602 A1 * | 1/2009 | Frost ........................ | B60R 7/08 |

(Continued)

*Primary Examiner* — Stephen T Gordon
(74) *Attorney, Agent, or Firm* — Edwin A. Sisson, Attorney at Law, LLC; Jeffrey J. Banyas

(57) ABSTRACT

An accessory mounting system is easily coupled to an inner portion of a pick-up bed, thus allowing a user to easily mount and hold equipment. The mounting system includes a number of panels which can be mounted to existing structures within the pick-up box, and which have a pattern of openings to accommodate straps, brackets, tie-downs, and other holding mechanisms.

6 Claims, 7 Drawing Sheets

(51) Int. Cl.
 *B60R 9/00* (2006.01)
 *B65D 90/00* (2006.01)

(56) References Cited

U.S. PATENT DOCUMENTS

| | | | | |
|---|---|---|---|---|
| 2012/0251261 A1* | 10/2012 | Liu | ........................ | B60P 7/0815 410/106 |
| 2013/0183116 A1* | 7/2013 | Lenz, Jr. | ............... | B60P 7/0815 410/144 |

\* cited by examiner

TRUCK BED ACCESSORY MOUNTING PANELS

BACKGROUND

The present invention is a panel system that attaches to the bed walls of a pickup truck and facilitate the mounting of accessories. In particular, the embodiments disclosed accommodate mounting of such panels without modification to the vehicle and provide considerable utility to the truck owner.

As is well known, the storage of accessories, tools and more within the box of a truck (e.g. pick-up truck, etc.) is a continuous challenge. This challenge has many facets, including where to put tools or accessories, and how to hold them in place. Balancing these challenges with the efficient use of truck space provides many trade-offs. One prior approach to this challenge is the addition of large tool boxes mounted towards the front of the pickup truck bed to store tools and accessories. Alternatively, these tool boxes could be situated within the truck bed at any location. Unfortunately, this occupies important bed space, leaving the bed shorter or smaller, and significantly less useful.

As another solution, nets/straps cooperating with several tie-downs has been used to hold tools in place. While this is effective, it often requires multiple straps, and the tie-downs are not always conveniently located.

These solutions are often difficult to use, and do not provide useful resources for the user. They also fail to provide the user a method of securing individual items, as to prevent movement, damage and noise. It would be beneficial to have a mechanism for storing and organizing items which is easy to use, adaptable, and flexible.

SUMMARY

A system of panels, or a single panel designed to attach to the bedside wall of a pickup truck and provide a series of mounting holes and slots for common clamps and other means of securing accessories provides an efficient and useful solution. The panels are attached to the bedside wall using mounting points and features available within the truck when delivered from the factory. This system also provides a means of mounting and organizing truck accessories such as a tool kit, flashlight, shovel, tow strap, etc so that those items do not clutter the bed of the truck, rendering it significantly less useful. Without the installed panels, the side walls of a pickup truck bed provide very few features which allow a user to stow and organize belongings. The result is that those items have a tendency to be less accessible and to move around the truck bed.

The size, shape and mounting of these panels differs based on the make and model of the vehicle, but are generally larger towards the rear of the bed and smaller towards the front. In one embodiment, which fits 2015 and newer F-150 models, the panels mount to the Ford 'BoxLink' threaded mounting features built into the bedside wall, as well as tie-down bracket points. This particular model and most others will use a slightly different panel towards the rear on each side. The panels towards the front in the case of the F-150 are identical. Other embodiments will mount to the edge of the bedside cap using clamps, the same way that many pickup truck covers attach.

BRIEF DESCRIPTION OF THE DRAWINGS

Various objects and advantages of the embodiments of the invention can be seen from the following detailed description in conjunction with the drawings, in which.

DESCRIPTION

Figure 1:
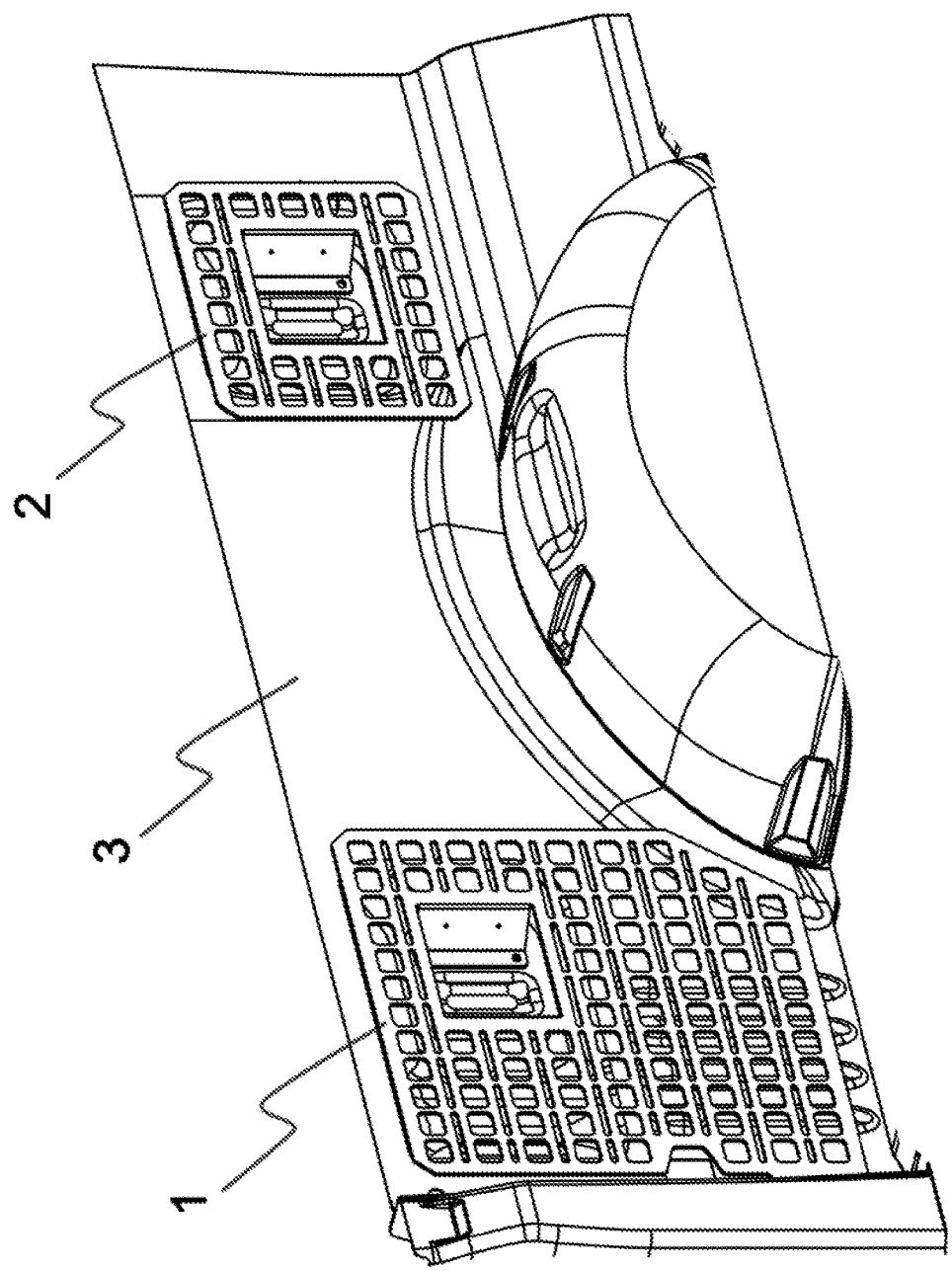
FIG. 1 is a perspective view or a pick-up truck bed showing a Bedside Rack System installed therein.

Referring now to FIG. 1, a rear bedside panel 1 and a front bedside panel 2 are illustrated as typically installed on the driver's side of the vehicle. In this case both front bedside panel 2 and rear bedside panel 1 are mounted on the driver's side of the vehicle. As illustrated in the embodiment shown, the rear bedside panel 1 is installed using six bolts and existing mounting points in the truck bed. More specifically, four of be bolts are coupled to the a set of mounting holes 8 (commonly referred to as BoxLink mounting holes) and two of the bolts are coupled to a set of tie down mounting holes 9. Similarly, front bedside panel 2 is installed using four bolts coupled to the Boxlink mounting holes 8. The illustrated embodiment is designed to efficiently fit in the truck bed of Ford F-150 line of pick-up trucks (including Raptor models). That said, and as further outlined below, modifications could be easily incorporated which allow the device to be applied to many different makes and models of trucks where the bedside rack system can benefit the user.

Figure 2:
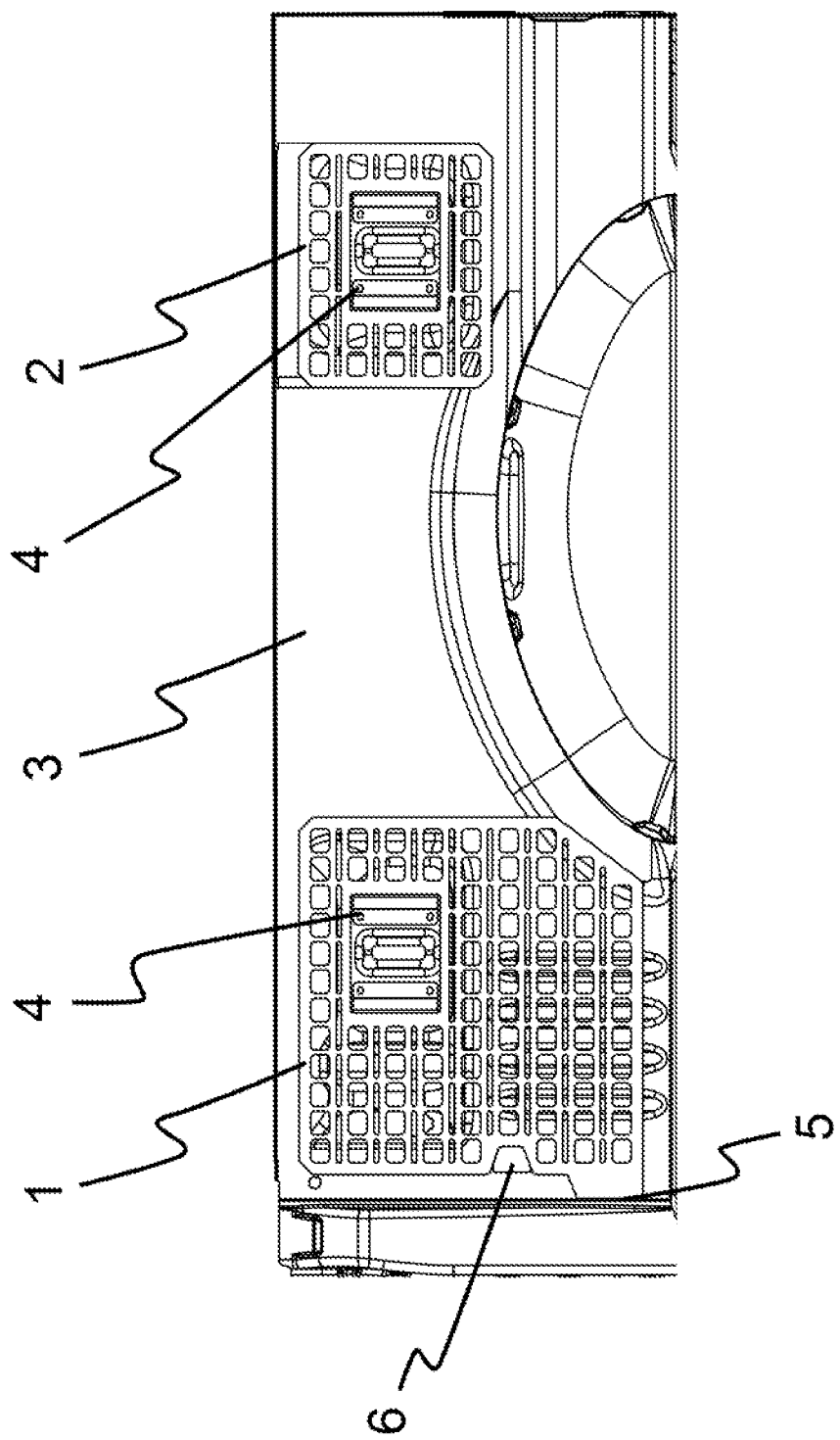
FIG. 2 is a front view of the bedside rack system installed on one side of a pick-up truck bed.
Figure 3:
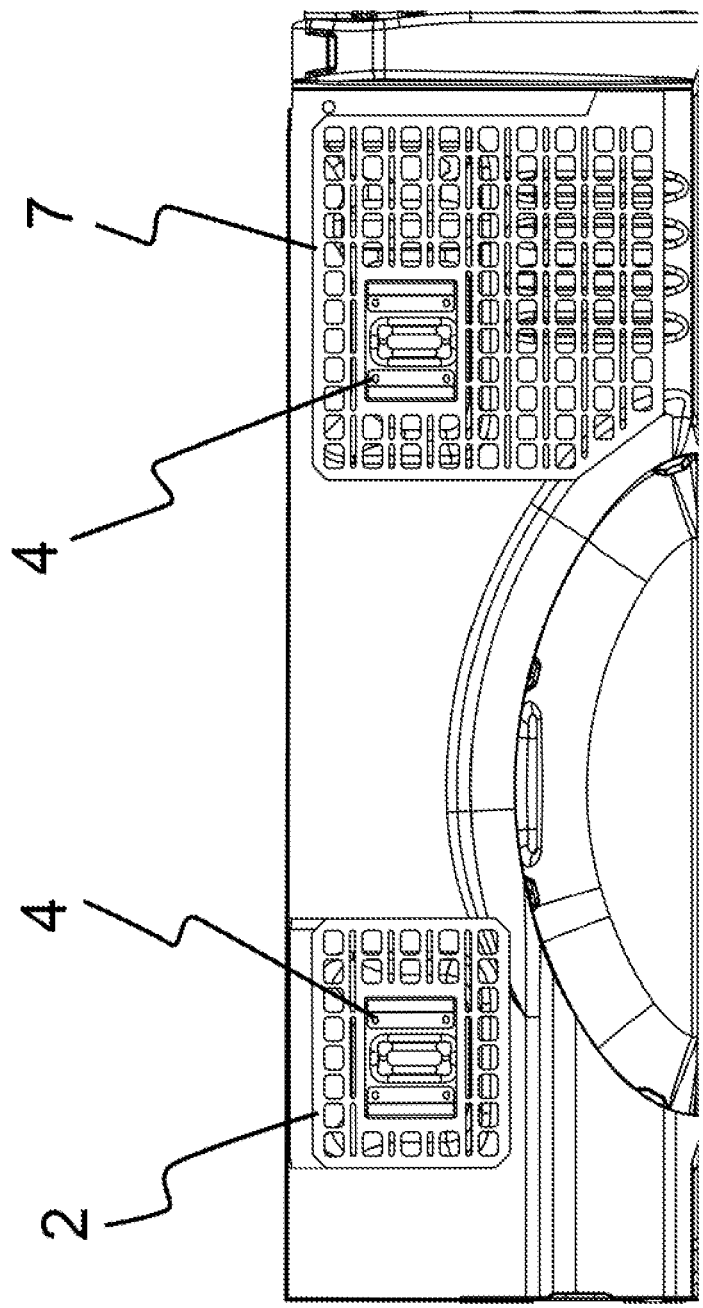
FIG. 3 is a front view of the bedside rack system installed on an opposite side of a pick-up truck bed.
Figure 4:
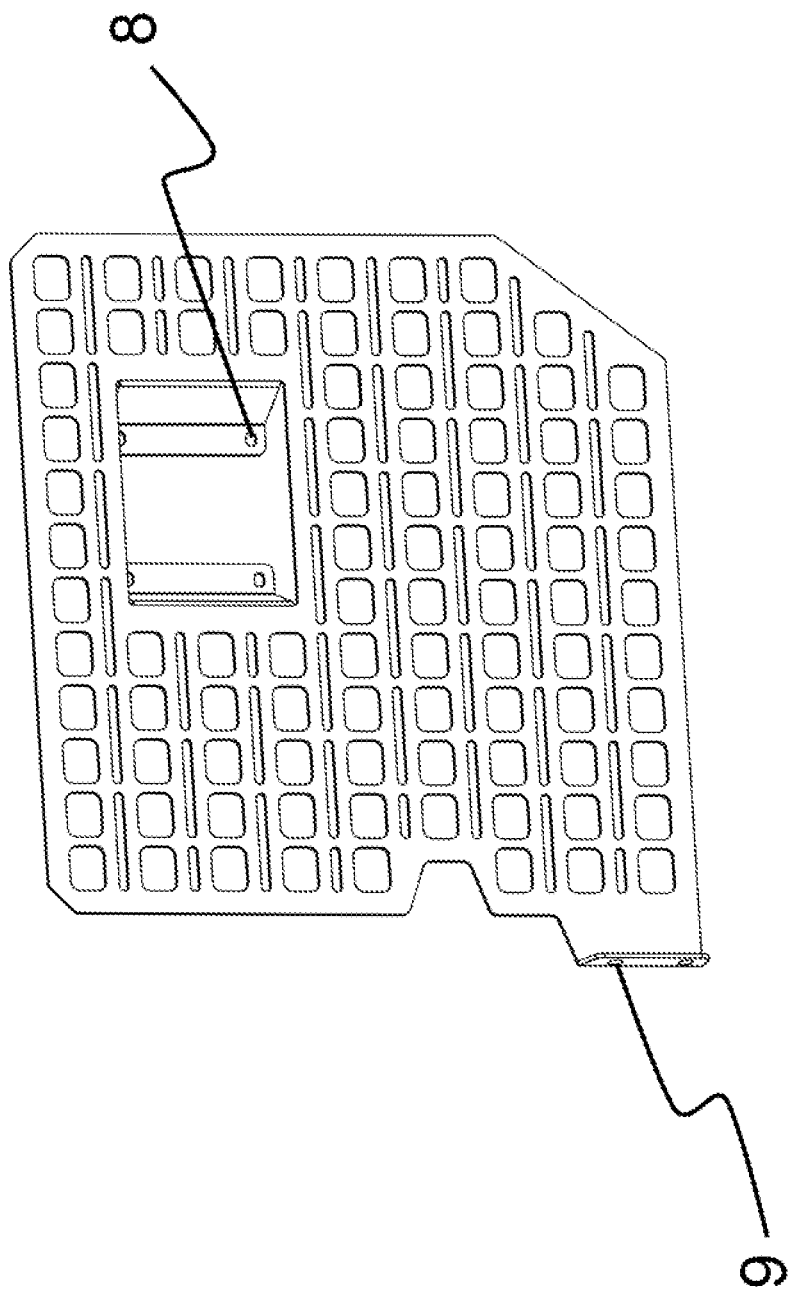
FIG. 4 shows a perspective view of a rear bedside panel alone.

FIG. 2 shows an alternate view of rear bedside panel 1 and front bedside panel 2, while also illustrating a bed light switch clearance feature 6 that is incorporated therein. As will be recognized, FIG. 3 shows the passenger side a truck bed, better illustrating both rear bedside panel 1 and front bedside panel 2 mounted to the passenger side of the truck bed. The passenger side is substantially similar, except for the bed light switch clearance feature 6 being a mirror of the driver's side.

Figure 5:
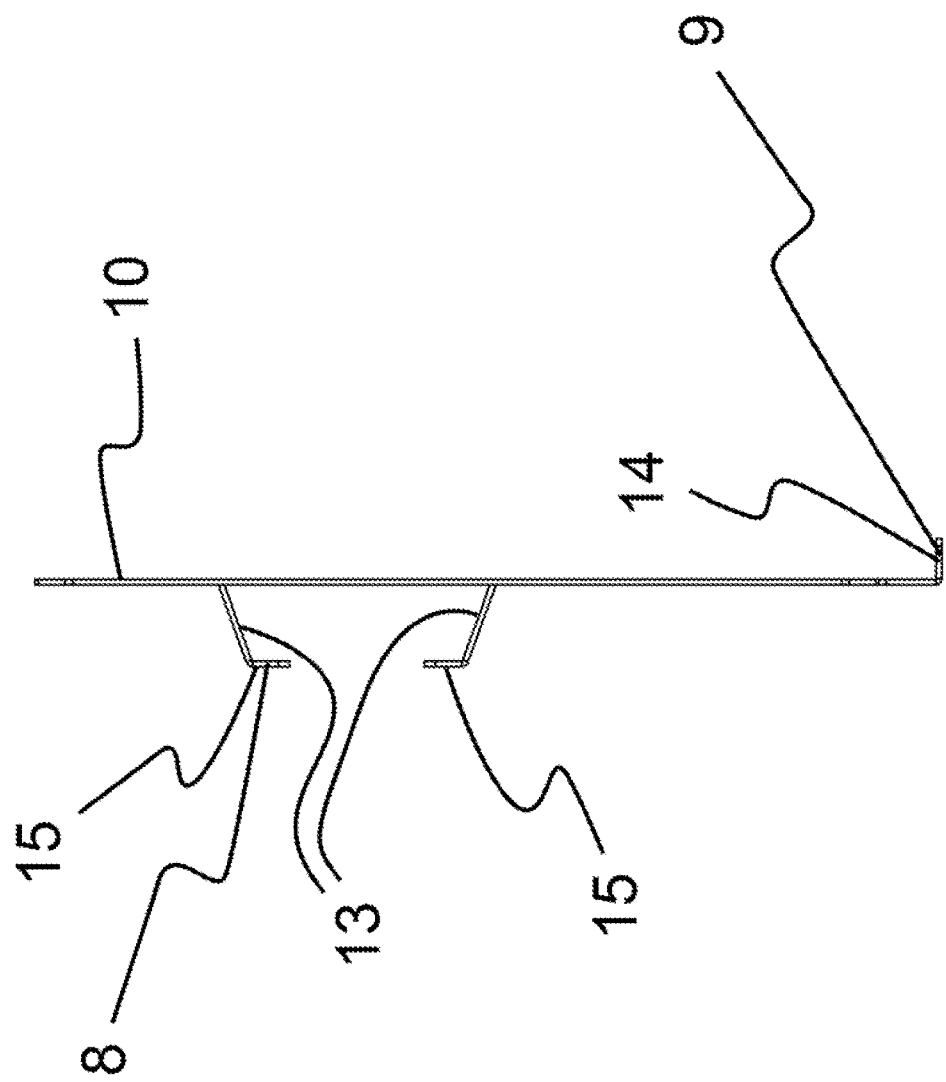
FIG. 5 is a top view of the rear bedside panel.

In operation one uses the panels as a means of mounting clamps or other devices intended to attach or secure accessories within the pickup bed. Each panel has a substantially planar main panel portion 10, which has a number of slots 11 and/or holes 12. In many circumstance, a predetermined pattern of slots and/or openings is used, thus providing many options for a user. A number of mounting extensions are also included, which can provide the above mentioned attachment to the truck. As best illustrated in FIG. 5, one embodiment of the mounting structure includes at least one pair of inwardly angled tabs 13 which extend from portions of main panel portion 10. These inwardly angled tabs 13 are configured to have Boxlink mounting holes 8 contained in a lip portion 15. As can be seen, these structures are easily formed by bending certain portions of the main panel portion 10 inwardly. As will be appreciated, these type of attachment features are easily formed during a manufacturing process. In addition, a bottom lip member 14 also extends from main panel member 10. Bottom lip member 14 is configured to support the above mentioned tie down mounting holes 9, thus further accommodating mounting mechanism (i.e. mounting bolts).

Figure 6:
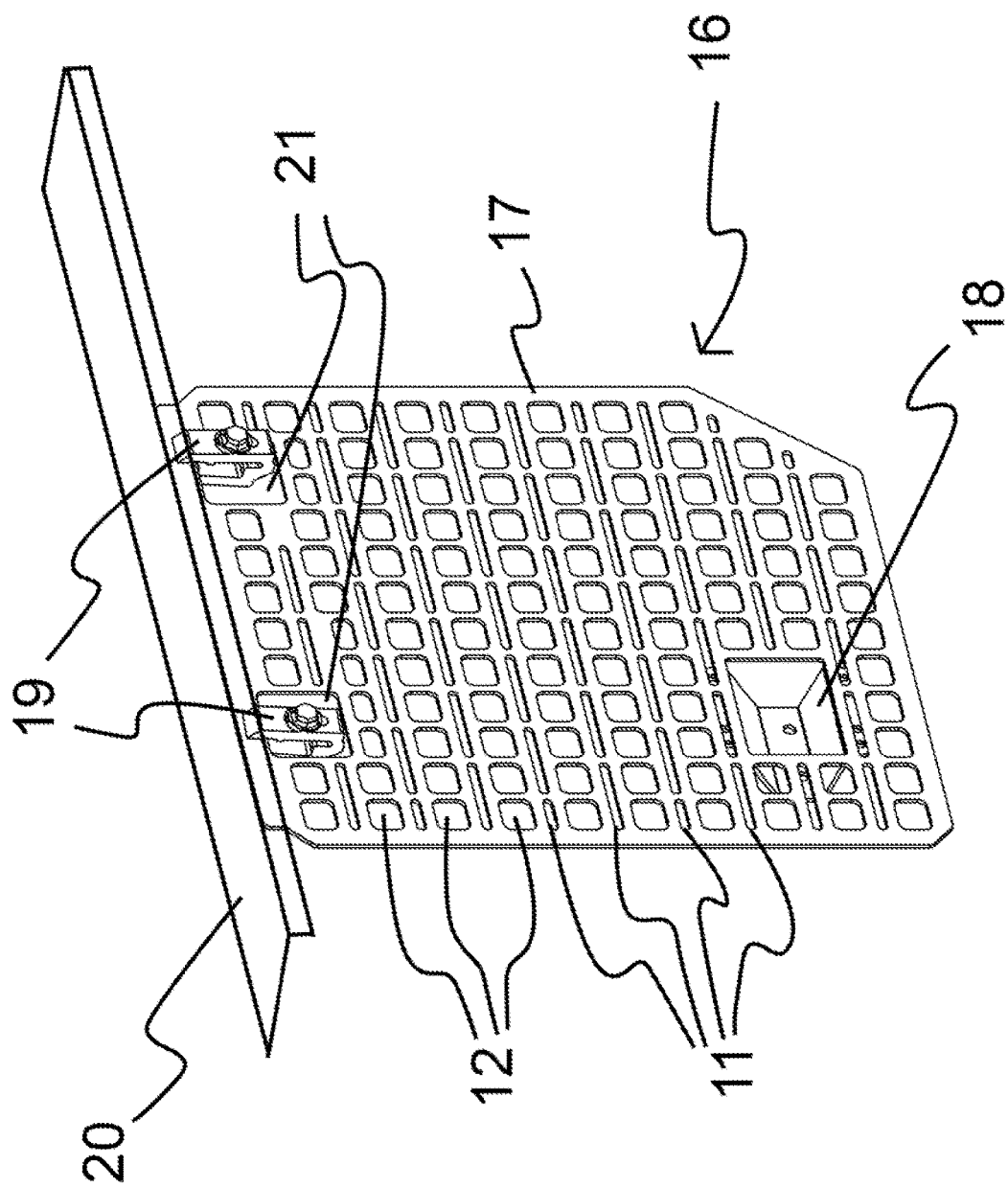
FIG. 6 illustrates a bedside panel with an alternative mounting structure.

Naturally, other mounting structures could be used. For example, a stand-off could be formed to allow mounting to the Boxlink mounting structures within the pick-up box, while also maintaining separation between main panel member 10 and the side portions of the pick-up truck. In yet a further example, FIG. 6 shows another embodiment of an accessory mounting panel 16. In this embodiment, mounting panel 16 includes a main panel portion 17 which supports a plurality of slots 11 and holes 12. In addition, a separate lower mounting bracket 18 is included, along with a pair of mounting brackets 19. Here, mounting brackets 19 are used to couple main panel member 17 with an upper lip 20 of the pick-up truck. As shown, mounting brackets 19 are U-Shaped, and are inserted into a related pair of openings 21 which exist in main panel portion 17. In this manner, main panel portion 17 can be securely held in position to accommodate operation. Again, variations of this approach could be used, with alternative brackets potentially cooperating with existing holes 12.

Figure 7:
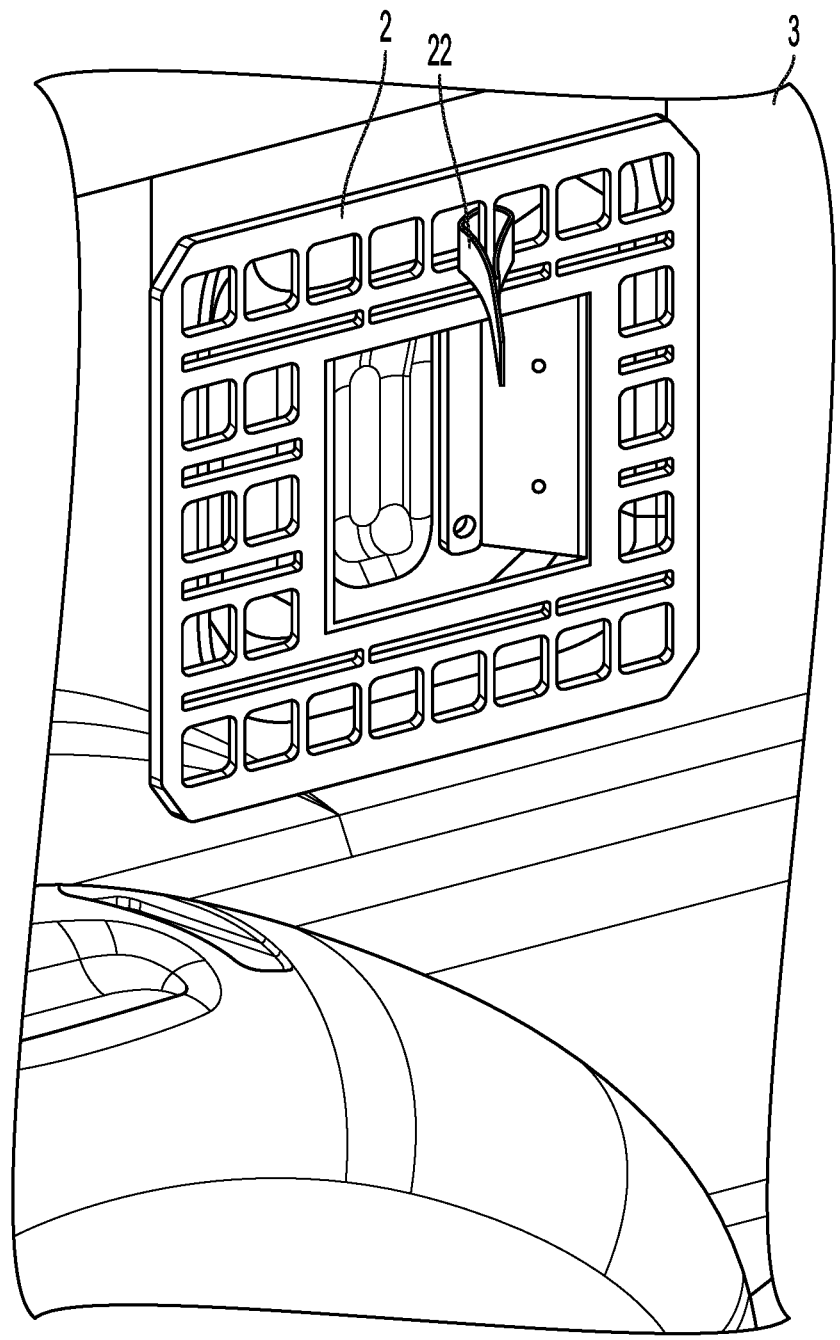
FIG. 7 illustrates a bedside panel with a strap.

In the illustrated embodiment, the mounting hole pattern is modeled after the military standard of MOLLE and PALS gear. The larger holes are sized and spaced to accept military MOLLE standard pouches and other attachments. The smaller holes and slots are sized and spaced to allow maximum adjustment when mounting other clamps, tie-down hooks and accessories. A series of attachments, designed specifically to interface with these panels can be used with the panels discussed above. In addition, the slots are of a size that is compatible with readily available hardware, straps ((22) as shown in FIG. 7), many clamps and device holders, thus making the system very adaptable and compatible. For example, users may mount small rubber clamps to secure a hammer or flashlight and may also mount larger rubber clamps to secure a fire extinguisher. Other clamps or brackets may be used to hold gas tanks, propane tanks, air tanks safely in place. Many tool and gear manufacturers offer their product, such as a floor jack, with a universal mounting bracket. This series of panels is meant to provide a mounting location for many different devices without requiring drilling or modification of the user's vehicle.

It is noted that other embodiments may combine both rear panel 1 and front panel 2 into a single larger panel. Some of additional embodiments may also offer an additional panel section, to connect the other two panels and form a continuous planar surface. Further embodiments may replace a single panel with two pieces the first to act as a mounting bracket for the panel and the second to act as the panel itself. This provides a user with a small amount of flexibility during installation, to accommodate other possible modifications to the vehicle.

Yet another embodiment would use the upper lip of the bed and the other surfaces of the bed to brace against and create a rigid mounting solution in the absence of useable threaded features. The panels may be secured to the upper lip using a clamp or series of clamps (as discussed above in relation to FIG. 6) while the user may, at their own discretion, choose to drill and bolt as an alternate means of attachment to the upper lip. In the absence of useable threaded features, the system may also include the use of threaded inserts, to be installed by the user into the surfaces of the bed, using a hole drilled in the truck.

Another embodiment would use unthreaded features in the bed of a truck, such as the GMC Sierra and Chevrolet Silverado, as mounting locations. A bracket may be manufactured using sheet metal, cnc machining or casting, that attached to an unthreaded feature or hole and provides a threaded mounting location. The bracket described would be inserted into the hole and then secured using hardware that braces against the inaccessible side of the panel, pinching the panel for strength. This bracket may also provide additional unthreaded features that a panel can be attached to.

Although the above mechanism has been described as a fitting the Ford F-150 (including Raptor models), modifications could be easily incorporated which allow the device to be applied to many different makes and models of trucks where the Bedside Rack System can benefit the user. These makes and models include, but are not limited to, the Ford Super Duty, Ford Ranger, Chevy Silverado, GMC Sierra, Toyota Tundra, Toyota Tacoma and Dodge Ram. More significantly, the above embodiments of the Bedside Rack System can be made to easy fit many vehicle models without significant rework.

The system may also be modified to fit into the rear cargo area of a Sport Utility Vehicle using the threaded mounting points typically available.

Various embodiments of the invention have been described above for purposes of illustrating the details thereof and to enable one of ordinary skill in the art to make and use the invention. The details and features of the disclosed embodiments are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A pickup truck bed storage system comprising:
   a substantially planar mounting panel comprising:
      a plurality of slots;
      a plurality of holes;
      at least one mounting structure; and
      at least one U-Shaped bracket wherein the substantially planar mounting panel further comprises at least one opening, the at least one U-Shaped bracket is inserted into the opening, and the at least one U-Shaped bracket couples at least a portion of the substantially planar mounting panel to an upper lip of the pickup truck bed, and
   wherein each mounting structure of the at least one mounting structure is adapted to secure the substantially planar mounting panel to a bed wall of a pickup truck bed by passing a fastener through a mounting hole in the at least one mounting structure and into a mounting point in the pickup truck bed.

2. A pickup truck bed storage system, comprising:
   a substantially planar mounting panel comprising:
      a plurality of slots;
      a plurality of holes;
      at least one mounting structure; and
   wherein each mounting structure of the at least one mounting structure is adapted to secure the substantially planar mounting panel to a bed wall of a pickup truck bed by passing a fastener through a mounting hole in the at least one mounting structure and into a mounting point in the pickup truck bed,
   wherein at least one of the at least one mounting structure comprises:
      a pair of inwardly angled tabs extending from a surface of the substantially planar mounting panel; and
      a lip portion extending from each of the inwardly angled tabs, said lip portion comprising at least a first mounting hole, and
   wherein at least one of the at least one mounting structure comprises a bottom lip extending from a bottom edge of the substantially planar mounting panel, said bottom lip comprising at least a second mounting hole.

3. The pickup truck bed storage system of claim 1, further comprising at least one strap configured to interact with at least one of the plurality of slots and/or at least one of the plurality of holes.

4. The pickup truck bed storage system of claim 2, further comprising at least one strap configured to interact with at least one of the plurality of slots and/or at least one of the plurality of holes.

5. The pickup truck bed storage system of claim 2, wherein the substantially planar mounting panel further comprises at least one bed light switch clearance feature.

6. The pickup truck bed storage system of claim 4, wherein the substantially planar mounting panel further comprises at least one bed light switch clearance feature.

\* \* \* \* \*